United States Patent
Li et al.

(10) Patent No.: US 11,254,186 B2
(45) Date of Patent: Feb. 22, 2022

(54) ELECTRIC VEHICLE, HEAT PUMP AIR CONDITIONER ASSEMBLY FOR ELECTRIC VEHICLE, AND CONTROL METHOD THEREOF

(71) Applicants: Gree Electric Appliances (Wuhan) Co., Ltd, Hubei (CN); Gree Electric Appliances, Inc. of Zhuhai, Guangdong (CN)

(72) Inventors: Junfeng Li, Guangdong (CN); Huaying Chen, Guangdong (CN); Lei Han, Guangdong (CN); Xiao Li, Guangdong (CN); Aibin Guo, Guangdong (CN)

(73) Assignees: Gree Electric Appliances (Wuhan) Co., Ltd, Wuhan (CN); Gree Electric Appliances, Inc. of Zhuhai, Zhuhai (CN)

( * ) Notice: Subject to any disclaimer, the term of this patent is extended or adjusted under 35 U.S.C. 154(b) by 22 days.

(21) Appl. No.: 16/500,227

(22) PCT Filed: Dec. 22, 2017

(86) PCT No.: PCT/CN2017/118106
§ 371 (c)(1),
(2) Date: Oct. 2, 2019

(87) PCT Pub. No.: WO2018/233259
PCT Pub. Date: Dec. 27, 2018

(65) Prior Publication Data
US 2021/0094389 A1  Apr. 1, 2021

(30) Foreign Application Priority Data

Jun. 19, 2017 (CN) .......................... 201710464346.0

(51) Int. Cl.
*B60H 1/00* (2006.01)
*B60H 1/32* (2006.01)

(52) U.S. Cl.
CPC ..... *B60H 1/00907* (2013.01); *B60H 1/00735* (2013.01); *B60H 1/00849* (2013.01);
(Continued)

(58) Field of Classification Search
CPC ............ B60H 1/00899; B60H 1/00907; B60H 2001/00935; B60H 1/00849;
(Continued)

(56) References Cited

U.S. PATENT DOCUMENTS 5,727,393 A  *  3/1998  Mahmoudzadeh ..... F25D 17/02
                                                                                                62/156
2002/0036080 A1    3/2002  Itoh et al.
(Continued)

FOREIGN PATENT DOCUMENTS

CN      201297814 Y     8/2009
CN      101975422 A     2/2011
(Continued)

OTHER PUBLICATIONS

International Search Report, dated Mar. 21, 2018, in International application No. PCT/CN2017/118106, filed on Dec. 22, 2017.
(Continued)

*Primary Examiner* — Frantz F Jules
*Assistant Examiner* — Jason N Thompson
(74) *Attorney, Agent, or Firm* — McAndrews, Held & Malloy, Ltd.

(57) ABSTRACT

A heat pump air conditioner assembly for an electric vehicle and a control method thereof, and an electric vehicle with the heat pump air conditioner assembly for the electric vehicle are provided. The heat pump air conditioner assembly includes a heat pump air conditioning system and a HVAC box body. An in-vehicle heat exchanger of the heat pump air conditioning system is located in the HVAC box body. An auxiliary heater is also arranged in the HVAC box body. The auxiliary heater is located at a leeward side of the in-vehicle heat exchanger. The heat pump air conditioning system is provided with a defrosting branch connecting with a refrigerant outlet of an external heat exchanger and a
(Continued)

suction port of a compressor. When the heat pump air conditioning system is in a defrosting mode, the HVAC box body supplies air to the vehicle, the auxiliary heater is turned on.

13 Claims, 5 Drawing Sheets

(52) U.S. Cl.
CPC .............. *B60H 2001/00935* (2013.01); *B60H 2001/00942* (2013.01)

(58) Field of Classification Search
CPC ...... B60H 1/00785; B60H 2001/00961; B60H 2001/3255
USPC .......................................................... 62/159
See application file for complete search history.

(56) References Cited

U.S. PATENT DOCUMENTS

| | | | | |
|---|---|---|---|---|
| 2005/0039959 | A1* | 2/2005 | Fruhauf | B60H 1/00878 429/434 |
| 2005/0178523 | A1* | 8/2005 | Itoh | B60L 58/33 165/42 |
| 2013/0055746 | A1* | 3/2013 | Yokoo | B60H 1/00842 62/238.1 |
| 2015/0285567 | A1* | 10/2015 | Hokazono | B23P 15/26 165/181 |
| 2016/0116202 | A1* | 4/2016 | Takenaka | F25D 21/002 62/140 |
| 2016/0265819 | A1* | 9/2016 | Durrani | B60H 1/00907 |

FOREIGN PATENT DOCUMENTS

| | | | | |
|---|---|---|---|---|
| CN | 103383157 | A | 11/2013 | |
| CN | 103629871 | A | 3/2014 | |
| CN | 104848497 | A | 8/2015 | |
| CN | 205736772 | U | 11/2016 | |
| CN | 206141270 | U | 5/2017 | |
| CN | 107160972 | A | 9/2017 | |
| CN | 206826358 | U | 1/2018 | |
| JP | H10205934 | A | 8/1998 | |
| JP | 2007232274 | A | 9/2007 | |
| JP | 2011047607 | A | 3/2011 | |
| WO | WO-2016029092 | A1 * | 2/2016 | .............. F25B 49/02 |
| WO | WO-2016080343 | A1 * | 5/2016 | ......... B60H 1/00007 |

OTHER PUBLICATIONS

The extended European search report for Application No. 17914313.6, dated Feb. 4, 2021, European Patent Office, Germany (8 pages).

* cited by examiner

ELECTRIC VEHICLE, HEAT PUMP AIR CONDITIONER ASSEMBLY FOR ELECTRIC VEHICLE, AND CONTROL METHOD THEREOF

CROSS REFERENCE TO RELATED APPLICATIONS

The present disclosure is a 371 of International Patent Application No. PCT/CN2017/118106, filed Dec. 22, 2017, entitled "Electric Vehicle, Electric Vehicle Heat Pump Air Conditioner Assembly and Control Method Thereof," which claims priority of Chinese Patent Application No. 201710464346.0, submitted on Jun. 19, 2017, entitled "Electric Vehicle, Heat Pump Air Conditioner Assembly for Electric Vehicle, and Control Method thereof", the contents of which are hereby incorporated by reference in their entireties.

TECHNICAL FIELD

Some embodiments of the present disclosure relate to a technical field of vehicle air conditioner production, and more particularly to an electric vehicle, a heat pump air conditioner assembly for an electric vehicle, and a control method thereof.

BACKGROUND

A refrigeration portion and a heating portion of an air conditioner assembly of a conventional internal combustion engine vehicle are two separate systems. The refrigeration portion performs refrigeration with compressor. The heating portion is implemented by waste heat of the internal combustion engine. Since an electric vehicle has eliminated the internal combustion engine, it is impossible to use the waste heat of the internal combustion engine to achieve heating.

With the development of technology, a conventional heat pump type air conditioner is used in the electric vehicle. The conventional heat pump type air conditioner usually includes a compressor, a four-way valve, an outside-vehicle heat exchanger, a throttle valve, and an in-vehicle heat exchanger. When it is necessary to perform refrigeration, an in-vehicle heat exchanger is used as an evaporator. When it is necessary to perform heating, the in-vehicle heat exchanger is used as a condenser by the reversing of the four-way valve.

However, when the temperature in winter is low, an outside-vehicle heat exchanger used as an evaporator is easy to frost, and the heat exchange efficiency of the frosted outside-vehicle heat exchanger is greatly reduced, and the operating efficiency of the entire air conditioning system is greatly reduced, which requires the defrosting operation. At present, the conventional heat pump type air conditioner operates in a refrigeration cycle when defrosting, that is, the outside-vehicle heat exchanger is used as a condenser, and the in-vehicle heat exchanger is used as an evaporator. At this time, it is not possible to blow air into a cab, which causes no heat supplement to the interior of the vehicle during defrosting, so the temperature in the vehicle will be significantly reduced, and the comfort will be poor.

SUMMARY

In view of the current problem that a defrosting process of an electric vehicle is slow and there is no heat supplement in the vehicle during the defrosting process, an embodiment of the present disclosure provides a heat pump air conditioner assembly for an electric vehicle, so that a heat pump air conditioning system can still convey hot air to the interior of the vehicle when being in a defrosting mode, thereby avoiding the temperature of the interior of the vehicle drop, ensuring ride comfort, and increasing the defrosting speed.

At least one embodiment of the present disclosure also provides a control method of the above heat pump air conditioner assembly for the electric vehicle.

At least one embodiment of the present disclosure further provides an electric vehicle with the above heat pump air conditioner assembly for the electric vehicle.

To achieve the above objective, the heat pump air conditioner assembly for the electric vehicle provided by some embodiments of the present disclosure may include a heat pump air conditioning system, a Heating, Ventilation and Air Conditioning (HVAC) box body and an auxiliary heater. In the heat pump air conditioning system, a four-way valve includes four ports. A first port of the four ports may connect with an exhaust port of a compressor by a first pipeline, a second port of the four ports may connect with an outside-vehicle heat exchanger by a second pipeline, a third port of the four ports may connect with a suction port of the compressor by a third pipeline, and a fourth port of the four ports may connect with an in-vehicle heat exchanger by a fourth pipeline. The outside-vehicle heat exchanger and the in-vehicle heat exchanger may be connected in series by a fifth pipeline to form a refrigerant loop. The heat pump air conditioning system may further include a defrosting branch and a defrosting electromagnetic valve. One end of the defrosting branch may connect with the fifth pipeline, and the other end may connect with the third pipeline. The defrosting electromagnetic valve may be arranged on the defrosting branch, and configured to control an on-off of the defrosting branch. The in-vehicle heat exchanger may be located in the HVAC box body. The auxiliary heater may be also arranged in the HVAC box body. The auxiliary heater may be located at a leeward side of the in-vehicle heat exchanger. When the heat pump air conditioning system is in a defrosting mode, the defrosting electromagnetic valve may be turned on, the HVAC box body may supply air to the vehicle, and the auxiliary heater may be turned on.

In an exemplary embodiment, the heat pump air conditioner assembly includes a cold and warm ventilation door arranged in the HVAC box body, the HVAC box body may be located at a leeward side of the in-vehicle heat exchanger, when the cold and warm ventilation door is located at a first position, all of intake air may pass through the auxiliary heater, when the cold and warm ventilation door is located at a second position, a portion of intake air may pass through the auxiliary heater, and when the cold and warm ventilation door is located at a third position, all of intake air may not pass through the auxiliary heater.

In an exemplary embodiment, the in-vehicle heat exchanger may include a first in-vehicle heat exchanger and a second in-vehicle heat exchanger connected in parallel, the first in-vehicle heat exchanger may connect with the fifth pipeline by a first inflow branch and connect with the fourth pipeline by a first outflow branch, the second in-vehicle heat exchanger may connect with the fifth pipeline by a second inflow branch and connect with the fourth pipeline by a second outflow branch, the first inflow branch may be provided with a first throttling element, and the second inflow branch may be provided with a second throttling element.

In an exemplary embodiment, the heat pump air conditioning system includes a flash evaporator disposed on the fifth pipeline, and the flash evaporator may be connected with an air supply port of the compressor.

In an exemplary embodiment, an air inlet of the HVAC box body may be provided with an adjusting member, when the adjusting member is located at a first position, the air inlet of the HVAC box body may be separated from an exterior of the vehicle and connect with a cab, when the adjusting member is located at a second position, the air inlet of the HVAC box body may connect with both the exterior of the vehicle and the cab, and when the adjusting member is located at a third position, the air inlet of the HVAC box body may connect with the exterior of the vehicle and may be separated from the cab.

In an exemplary embodiment, the auxiliary heater may be a Positive Temperature Coefficient (PTC) heater.

A control method of the heat pump air conditioner assembly for the electric vehicle is disclosed in the first aspect of the present disclosure, when a heat pump air conditioning system is in a defrosting mode, make an exhaust port of a compressor connect with an outside-vehicle heat exchanger, and make a defrosting electromagnetic valve turn on, so that a refrigerant passes through the outside-vehicle heat exchanger and then directly flows back to an air inlet of the compressor by a defrosting branch and a third pipeline, and make a Heating, Ventilation and Air Conditioning (HVAC) box body supply air to an interior of the vehicle, and turn on an auxiliary heater.

A control method of the heat pump air conditioner assembly for the electric vehicle is disclosed in the second aspect of the present disclosure, when a heat pump air conditioning system is in a defrosting mode, make an exhaust port of a compressor connect with an outside-vehicle heat exchanger, make a defrosting electromagnetic valve turn on, make a Heating, make Ventilation and Air Conditioning (HVAC) box body supply air to an interior of the vehicle, turn on an auxiliary heater, and make the cold and warm ventilation door locate at a first position.

A control method of the heat pump air conditioner assembly for the electric vehicle is disclosed in the third aspect of the present disclosure, an environment temperature outside the vehicle $T_{outside}$ may be collected and compared with a preset refrigeration temperature $t_1$. If $T_{outside}$ is greater than or equal to $t_1$, an action A may be performed, the action A is: making both a first in-vehicle heat exchanger and a second in-vehicle heat exchanger serve as evaporators, and making an openness of a first throttling element be a maximum value and making an openness of a second throttling element be a maximum value.

In an exemplary embodiment, the environment temperature outside the vehicle $T_{outside}$ may be collected and compared with a preset heating temperature $t_2$, where $t_2$ is less than $t_1$. If $T_{outside}$ is less than or equal to $t_2$, an action B may be performed, the action B is: making both the first in-vehicle heat exchanger and the second in-vehicle heat exchanger serve as condensers, and making an openness of the first throttling element be a maximum value and an openness of the second throttling element be a maximum value.

In an exemplary embodiment, if $T_{outside}$ is greater than $t_2$ and less than $t_1$, a temperature in the vehicle $T_{in}$ may be collected and compared with a preset mode switching temperature $t_0$. If $T_{in}$ is greater than or equal to $t_0$, an action C may be performed, the action C is: making both the first in-vehicle heat exchanger and the second in-vehicle heat exchanger serve as evaporators, and making the openness of the first throttling element be a maximum value, and making the openness of the second throttling element be a minimum value; and if $T_{in}$ is less than to and a heat pump air conditioning system is not in a defrosting mode, perform an action D, the action D is: making both the first in-vehicle heat exchanger and the second in-vehicle heat exchanger serve as condensers, making the openness of the first throttling element be a minimum value, and making the openness of the second throttling element be a maximum value.

In an exemplary embodiment, when the heat pump air conditioning system is in a defrosting mode, an action E may be performed, the action E is: making an exhaust port of a compressor connect with an outside-vehicle heat exchanger and making the openness of the first throttling element be a minimum value and making the openness of the second throttling element be a minimum value, turning on a defrosting electromagnetic valve, a Heating, Ventilation and Air Conditioning (HVAC) box body supplying air to an interior of the vehicle, and turning on an auxiliary heater.

In an exemplary embodiment, when $T_{outside}$ is greater than or equal to $t_1$ and the heat pump air conditioning system is in a defrosting mode, an action F may be performed in addition to the action A, the action F is: making an air inlet of the HVAC box body switch to an external cycle.

In an exemplary embodiment, when $T_{outside}$ is less than or equal to $t_2$ and the heat pump air conditioning system is in a defrosting mode, an action F may be performed in addition to the action B, the action F is: making an air inlet of the HVAC box body switch to an external cycle.

In an exemplary embodiment, when $T_{outside}$ is greater than $t_2$ and less than $t_1$ and $T_{in}$ is greater than or equal to $t_0$, if the heat pump air conditioning system is in a defrosting mode, an action F may be performed in addition to the action C, the action F is: making an air inlet of the HVAC box body switch to an external cycle; and when $T_{outside}$ is greater than $t_2$ and less than $t_1$ and $T_{in}$ is less than $t_0$, if the heat pump air conditioning system is in the defrosting mode, perform an action H, the action H is: making a four-way valve reverse, making both the first in-vehicle heat exchanger and the second in-vehicle heat exchanger serve as evaporators, making the openness of the first throttling element be a maximum value, and making the openness of the second throttling element be a minimum value, so that making the air inlet of the HVAC box body switch to an external cycle.

In an exemplary embodiment, when $T_{outside}$ is greater than $t_2$ and less than $t_1$ and $T_{in}$ is less than $t_0$, if the heat pump air conditioning system is in a defrosting mode, an action K may also be performed, the action K is: turning on the auxiliary heater.

In an exemplary embodiment, $t_1$ is greater than or equal to 29° C. and less than or equal to 32° C., $t_2$ is greater than or equal to 0° C. and less than or equal to 5° C., and to is greater than or equal to 22° C. and less than or equal to 25° C.

The electric vehicle disclosed in the present disclosure may be with the heat pump air conditioner assembly for the electric vehicle disclosed in any one of the above.

In the heat pump air conditioner assembly for the electric vehicle disclosed in the present disclosure, since an auxiliary heat exchanger is arranged in the HVAC box body, and when the heat pump air conditioning system is in a defrosting mode, the HVAC box body supplies air to the interior of the vehicle and the auxiliary heater is turned on, air is supplied to the interior of the vehicle after being heated by the auxiliary heater, which enables heat to be conveyed to the interior of the vehicle during the defrosting of the heat pump system, ensuring proper temperature inside the vehicle, and improving ride comfort. Meanwhile, in the defrosting mode, the defrosting electromagnetic valve is turned on, and a high-temperature and high-pressure refrigerant discharged from the compressor enters the outside-vehicle heat exchanger and directly flows back to the compressor for compression again, which can rapidly increase the temperature of the outside-vehicle heat exchanger and accelerate the defrosting process.

In the control method of the heat pump air conditioner assembly disclosed in the present disclosure, since the heat pump air conditioner assembly is controlled, when the heat pump air conditioning system is in a defrosting state, the HVAC box body is controlled to supply air to the interior of the vehicle, the auxiliary heater is turned on in order to achieve continuous heating during the defrosting of the air conditioner, and the defrosting electromagnetic valve is turned on to accelerate the defrosting process.

Since the electric vehicle disclosed in the present disclosure is with the above heat pump air conditioner assembly for the electric vehicle, the electric vehicle has the technical advantages corresponding to the above heat pump air conditioner assembly, and will not be further described herein.

DESCRIPTION OF THE REFERENCE SIGNS

Figure 1:
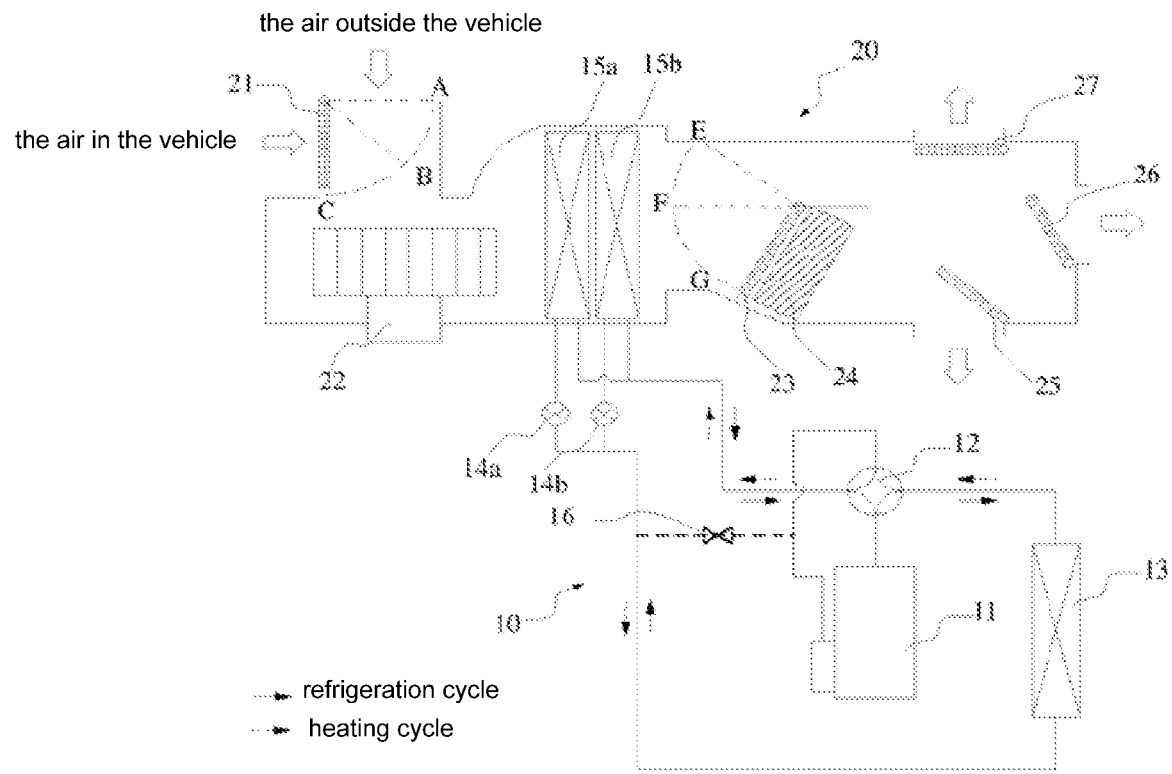
FIG. 1 is a schematic diagram of a high-power refrigeration/heating mode system cycle of A heat pump air conditioner assembly for an electric vehicle disclosed in a first embodiment of the present disclosure.

10—Heat pump air conditioning system
11—Compressor
12—Four-way valve
13—Outside-vehicle heat exchanger
14a—First throttling element
14b—Second throttling element
15a—First in-vehicle heat exchanger
15b—Second in-vehicle heat exchanger
16—Defrosting electromagnetic valve
17—Air supply electromagnetic valve
18—Flash evaporator
19—Throttling element
20—HVAC box body
21—Adjusting member
22—Cycle fan
23—Cold and warm ventilation door
24—Auxiliary heater
25—Foot blowing ventilation door
26—Face blowing ventilation door
27—Defogging/defrosting ventilation door

DETAILED DESCRIPTION OF THE EMBODIMENTS

One of the cores of the present disclosure is to provide a heat pump air conditioner assembly for an electric vehicle, so that a heat pump air conditioning system can still convey hot air to the interior of the vehicle when being in a defrosting mode, thereby avoiding the temperature of the interior of the vehicle drop, and ensuring ride comfort.

Another core of the present disclosure is to provide a control method of the above heat pump air conditioner assembly for the electric vehicle.

Still another core of the present disclosure is to provide an electric vehicle with the above heat pump air conditioner assembly for the electric vehicle.

In order to make those skilled in the art better understand the present disclosure, the present disclosure will be further described in detail below in conjunction with the accompanying drawings and specific implementation manners.

Referring to FIG. 1 to FIG. 6 together, the heat pump air conditioner assembly for the electric vehicle disclosed in the embodiment of the present disclosure includes a heat pump air conditioning system 10, an HVAC box body (Heating, Ventilation and Air Conditioning) and an auxiliary heater 24. An in-vehicle heat exchanger of the heat pump air conditioning system 10 is located in the HVAC box body 20, the auxiliary heater 24 is arranged in the HVAC box body 20, and the auxiliary heater 24 is located at a leeward side of the in-vehicle heat exchanger. When the air conditioner is in a defrosting mode, the HVAC box body 20 supplies air to an interior of the vehicle, and the auxiliary heater 24 is turned on. In the first embodiment, the heat pump air conditioning system 10 includes a compressor 11, an outside-vehicle heat exchanger 13, and an in-vehicle heat exchanger. A four-way valve 12 includes four ports, a first port of the four ports connects with an exhaust port of the compressor 11 by a first pipeline, a second port of the four ports connects with the outside-vehicle heat exchanger 13 by a second pipeline, a third port of the four ports connects with a suction port of the compressor 11 by a third pipeline, and a fourth port of the four ports connects with the in-vehicle heat exchanger by a fourth pipeline. The outside-vehicle heat exchanger 13 and the in-vehicle heat exchanger are connected in series by a fifth pipeline. So far, the entire refrigerant loop is formed.

On this basis, a defrosting branch is also arranged. As shown in FIG. 1 to FIG. 4, one end of the defrosting branch connects with the fifth pipeline, and the other end of the defrosting branch connects with the third pipeline. The defrosting branch is also provided with a defrosting electromagnetic valve 16. The defrosting electromagnetic valve 16 is configured to control an on-off of the defrosting branch. In the defrosting mode, the defrosting electromagnetic valve 16 is in an on state.

Since an auxiliary heat exchanger is arranged in the HVAC box body, and when the heat pump air conditioning system is in a defrosting mode, the HVAC box body supplies air to the interior of the vehicle and the auxiliary heater is turned on, air is supplied to the interior of the vehicle after being heated by the auxiliary heater, which enables heat to be conveyed to the interior of the vehicle during the defrosting of the heat pump system, ensuring proper temperature inside the vehicle, and improving ride comfort. Meanwhile, in the defrosting mode, the defrosting electromagnetic valve is turned on, and a high-temperature and high-pressure refrigerant discharged from the compressor enters the outside-vehicle heat exchanger and directly flows back to the compressor for compression again, which can rapidly increase the temperature of the outside-vehicle heat exchanger and accelerate the defrosting process.

There are two in-vehicle heat exchangers, namely a first in-vehicle heat exchanger 15a and a second in-vehicle heat exchanger 15b. As shown in FIG. 1 to FIG. 4, the first in-vehicle heat exchanger 15a and the second in-vehicle heat exchanger 15b are connected in parallel. The first in-vehicle heat exchanger connects with the fifth pipeline by a first inflow branch and connects with the fourth pipeline by a first outflow branch. The second in-vehicle heat exchanger 15b connects with the fifth pipeline by a second inflow branch and connects with the fourth pipeline by a second outflow branch. The first inflow branch is provided with a first throttling element 14a, and the second inflow branch is provided with a second throttling element 14b.

An air inlet of the HVAC box body 20 is provided with an adjusting member 21. The adjusting member 21 may be referred to as an internal and external cycle ventilation door. The adjusting member 21 has three adjusting positions. At the first position, the air inlet of the HVAC box body is separated from the exterior of the vehicle and connects with a cab, and at this time, the entire vehicle realizes an internal cycle of air. At the second position, the air inlet of the HVAC box body 20 connects with both the interior and exterior of the vehicle, and at this time, the air cycle manner of the entire vehicle is an internal cycle plus an external cycle. At the third position, the air inlet of the HVAC box body 20 connects with the exterior of the vehicle and is separated from the cab, and at this time, the entire vehicle realizes an external cycle of air. In addition, the heat pump air conditioner assembly includes a cold and warm ventilation door 23 arranged in the HVAC box body 20. As shown in FIG. 1 to FIG. 4, the auxiliary heater 24 is arranged in an air channel of the HVAC box body 20. The cold and warm ventilation door 23 also has three adjusting positions. When the cold and warm ventilation door 23 is at the first position, all of intake air passes through the auxiliary heater 24 to achieve auxiliary heating of all of the air by the auxiliary heater 24. When the cold and warm ventilation door 23 is at the second position, a portion of intake air passes through the auxiliary heater 24 to achieve auxiliary heating of a portion of the air by the auxiliary heater 24 to obtain an appropriate temperature. When the cold and warm ventilation door 23 is at the third position, all of the intake air does not pass through the auxiliary heater 24 to avoid heating of the air by the auxiliary heater 24.

It is to be noted that the type of the auxiliary heater 24 in the embodiment of the present disclosure is not limited. In the present disclosure, a PTC heater is recommended as the auxiliary heater 24. The so-called windward side and leeward side are defined as follows. Taking an in-vehicle heat exchanger as an example, a side that meets incoming wind in the HVAC box body for the first time is the windward side or upwind side of the in-vehicle heat exchanger, and correspondingly, the other side of the in-vehicle heat exchanger is the leeward side or the downwind side. In FIG. 1 to FIG. 6, the hollow arrows at various inlet and outlet positions of the HVAC box body indicate the flow directions of air.

Several main working modes of the vehicle heat pump air conditioner disclosed in the above first embodiment will be described below.

For a high-power refrigeration mode, referring to FIG. 1, in a heat pump air conditioning system, a solid line represents the passage of a refrigerant, and a dotted line represents pipeline cut-off, and no refrigerant passage. The refrigerant is acted by the compressor 11 and passes through the four-way valve 12, and then is transmitted to the outside-vehicle heat exchanger 13 for condensation heat release. The first throttling element 14a and the second throttling element 14b are both opened to respective openness. The refrigerant flowing out of the outside-vehicle heat exchanger 13 enters the first in-vehicle heat exchanger 15a and the second in-vehicle heat exchanger 15b for evaporation heat exchange. Finally, the refrigerant returns to the compressor 11 through the four-way valve 12 to complete a cycle. It can be seen that the two in-vehicle heat exchangers are used as evaporators during the refrigeration process, which can effectively improve the refrigeration capacity of the heat pump air conditioner assembly and increase the speed of air temperature adjustment in the vehicle, thereby improving the user experience.

The HVAC box body 20 is subjected to air treatment. Air is drawn by an air blower into an air channel through the air inlet, cooled by the first in-vehicle heat exchanger 15a and the second in-vehicle heat exchanger 15b, selectively heated or not heated by the auxiliary heater 24 through the cold and warm ventilation door 23, and then sent to an air outlet of the HVAC box body 20. According to the switch settings of different air outlets in the vehicle, the treated comfortable air can reach different positions (foot blowing, face blowing or defogging), and the adjusting member 21 at the air inlet can be manually or automatically selected to be at the first position, the second position or the third position to achieve an internal cycle, an internal or external cycle or an external cycle. The auxiliary heater 24 may be a PTC heater or may also be implemented by other heat sources, such as electric vehicle motor waste heat, and battery pack waste heat.

In the high-power refrigeration mode, if the adjusting member 21 is at the third position and a defogging ventilation door is opened, a front windshield may be defogged. Of course, the cold and warm ventilation door 23 may be placed at the first position, the second position or the third position as needed to achieve further heating and drying of all the air, further drying of a portion of the air or no further heating of the air.

For a high-power heating mode, also referring to FIG. 1, compared with the high-power refrigeration mode, the four-way valve 12 is reversed at this time, the flow direction of the refrigerant flowing out of the compressor 11 is opposite to the flow direction during the high-power refrigeration mode. Specifically, the refrigerant is acted by the compressor 11 and passes through the four-way valve 12, and then is transmitted to the in-vehicle heat exchanger for condensation heat release. The first throttling element 14a and the second throttling element 14b are both opened to respective openness. The refrigerant flowing out of the first in-vehicle heat exchanger 15a and the second in-vehicle heat exchanger 15b enters the outside-vehicle heat exchanger 13 for evaporation heat exchange. Finally, the refrigerant returns to the compressor 11 through the four-way valve 12 to complete a cycle. It can be seen that the two in-vehicle heat exchangers are used as condensers during the high-power heating process, which can effectively improve the heating capacity of the heat pump air conditioner assembly and increase the speed of air temperature adjustment in the vehicle, thereby improving the user experience.

The HVAC box body 20 is subjected to air treatment. Air is drawn by an air blower into an air channel through the air inlet, heated by the first in-vehicle heat exchanger 15a and the second in-vehicle heat exchanger 15b, selectively heated or not heated by the auxiliary heater 24 through the cold and warm ventilation door 23, and then sent to an air outlet of the HVAC box body 20. According to the switch settings of different air outlets in the vehicle, the treated comfortable air can reach different positions (foot blowing, face blowing or defogging/defrosting), and the adjusting member 21 at the air inlet can be manually or automatically selected to be at the first position, the second position or the third position to achieve an internal cycle, an internal or external cycle or an external cycle. The auxiliary heater 24 may be a Positive Temperature Coefficient (PTC) heater or may also be implemented by other heat sources, such as electric vehicle motor waste heat, and battery pack waste heat.

In the high-power refrigeration mode, if the adjusting member 21 is at the third position and a defogging ventilation door is opened, a front windshield may be defogged. Of course, the cold and warm ventilation door 23 may be placed at the first position, the second position or the third position as needed to achieve further heating and drying of all the air, further drying of a portion of the air or no further heating of the air.

Figure 2:
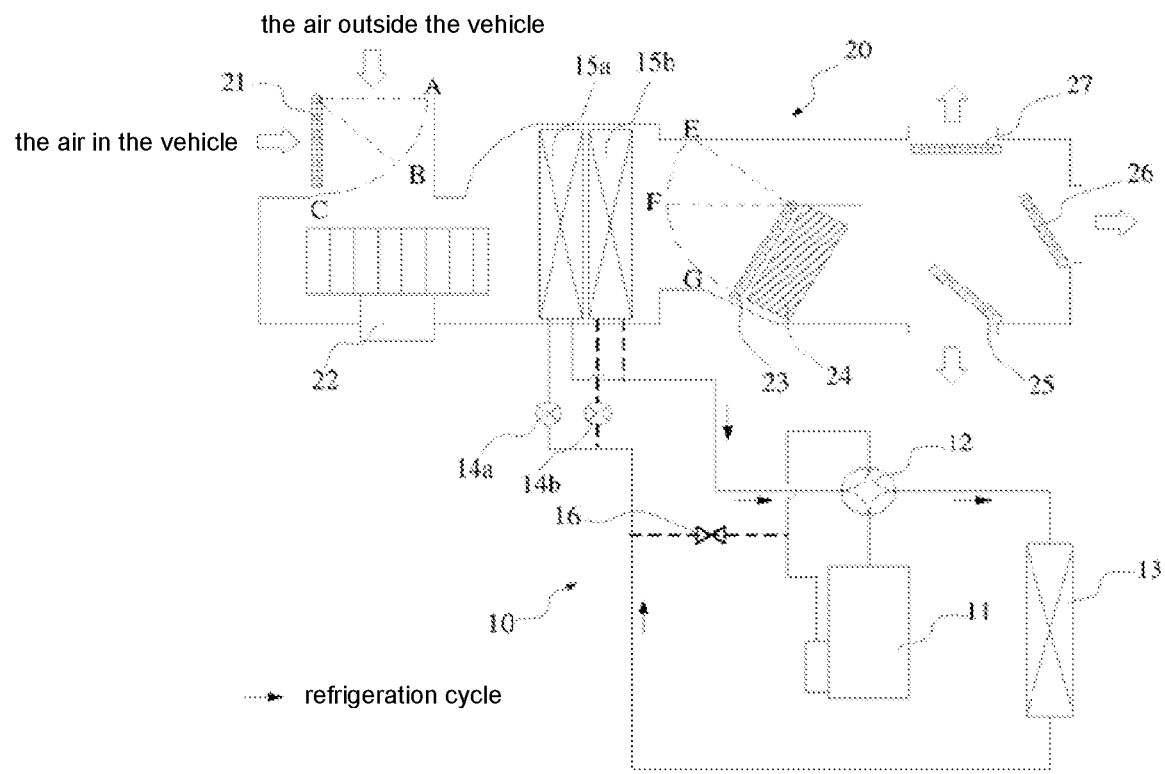
FIG. 2 is a schematic diagram of a low-power refrigeration (or low-power refrigeration defogging) cycle of A heat pump air conditioner assembly for an electric vehicle disclosed in the first embodiment of the present disclosure.

For a low-power refrigeration mode, as shown in FIG. 2, the heat pump air conditioning system 10 operates according to the refrigeration mode. The refrigerant is acted by the compressor 11 and passes through the four-way valve 12, and then is transmitted to the outside-vehicle heat exchanger 13 for condensation heat release. The first throttling element 14a is opened to respective openness, and the second throttling element 14b is completely closed. The refrigerant flowing out of the outside-vehicle heat exchanger 13 only enters the first in-vehicle heat exchanger 15a for evaporation heat exchange. Finally, the refrigerant returns to the compressor 11 through the four-way valve 12 to complete a cycle.

The HVAC box body 20 is subjected to air treatment. Air is drawn by an air blower into an air channel through the air inlet, cooled by the first in-vehicle heat exchanger 15a, selectively heated or not heated by the auxiliary heater 24 through the cold and warm ventilation door 23, and then sent to an air outlet of the HVAC box body 20. According to the switch settings of different air outlets in the vehicle, the treated comfortable air can reach different positions (foot blowing, face blowing or defogging), and the adjusting member 21 at the air inlet can be manually or automatically selected to be at the first position, the second position or the third position to achieve an internal cycle, an internal or external cycle or an external cycle.

In the low-power refrigeration mode, if the adjusting member 21 is at the second position or the third position and a defogging ventilation door is opened, a front windshield may be defogged. Of course, the cold and warm ventilation door 23 may be placed at the first position, the second position or the third position as needed to achieve further heating and drying of all the air, further drying of a portion of the air or no further heating of the air.

In addition, in the low-power refrigeration mode, and in the defogging state of the front windshield, if the humidity of air entering the HVAC box body is not large after the detection of a humidity sensor, the shutdown processing of the heat pump air conditioning system 10 may be performed. The air entering only through an external cycle can be blown to the front windshield.

Figure 3:
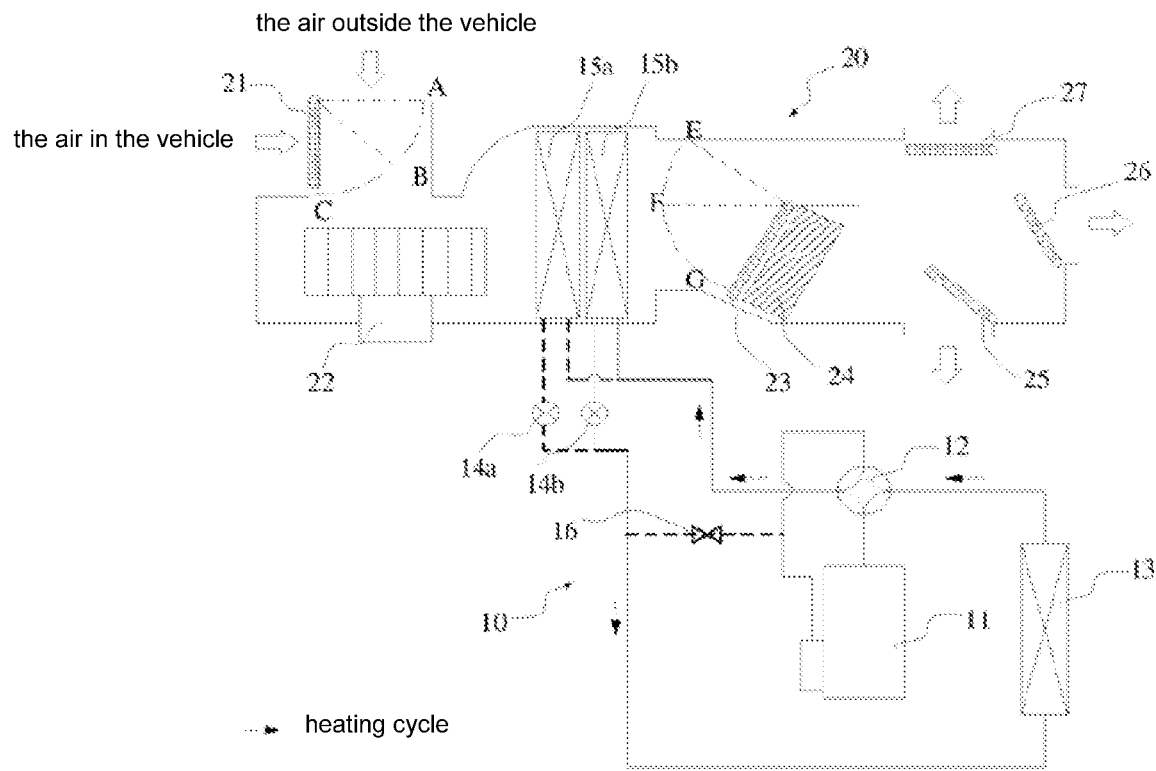
FIG. 3 is a schematic diagram of a low-power heating (or low-power heating defogging) cycle of A heat pump air conditioner assembly for an electric vehicle disclosed in the first embodiment of the present disclosure.

For a low-power heating mode, as shown in FIG. 3, the heat pump air conditioning system 10 operates according to the heating mode. The refrigerant is acted by the compressor 11 and passes through the four-way valve 12, and then is transmitted to the in-vehicle heat exchanger for condensation heat release. The first throttling element 14a is completely closed, and the second throttling element 14b is opened to respective openness. The refrigerant flowing out of the second in-vehicle heat exchanger only enters the outside-vehicle heat exchanger 13 for evaporation heat exchange. Finally, the refrigerant returns to the compressor 11 through the four-way valve 12 to complete a cycle.

The HVAC box body 20 is subjected to air treatment. Air is drawn by an air blower into an air channel through the air inlet, heated by the second in-vehicle heat exchanger 15b, selectively heated or not heated by the auxiliary heater 24 through the cold and warm ventilation door 23, and then sent to an air outlet of the HVAC box body 20. According to the switch settings of different air outlets in the vehicle, the treated comfortable air can reach different positions (foot blowing, face blowing or defogging), and the adjusting member 21 at the air inlet can be manually or automatically selected to be at the first position, the second position or the third position to achieve an internal cycle, an internal or external cycle or an external cycle.

The low-power refrigeration mode and the low-power heating mode are generally used when the outside temperature is neither too high nor too low. In this case, the refrigeration mode and heating mode are easily alternated. Since different in-vehicle heat exchangers are working during refrigeration and heating, the situation that condensed water condensed on the in-vehicle heat exchanger is reheated and enter the vehicle during the refrigeration process is avoided, thereby avoiding fogging of windows and the front windshield, and ensuring driving safety.

Figure 4:
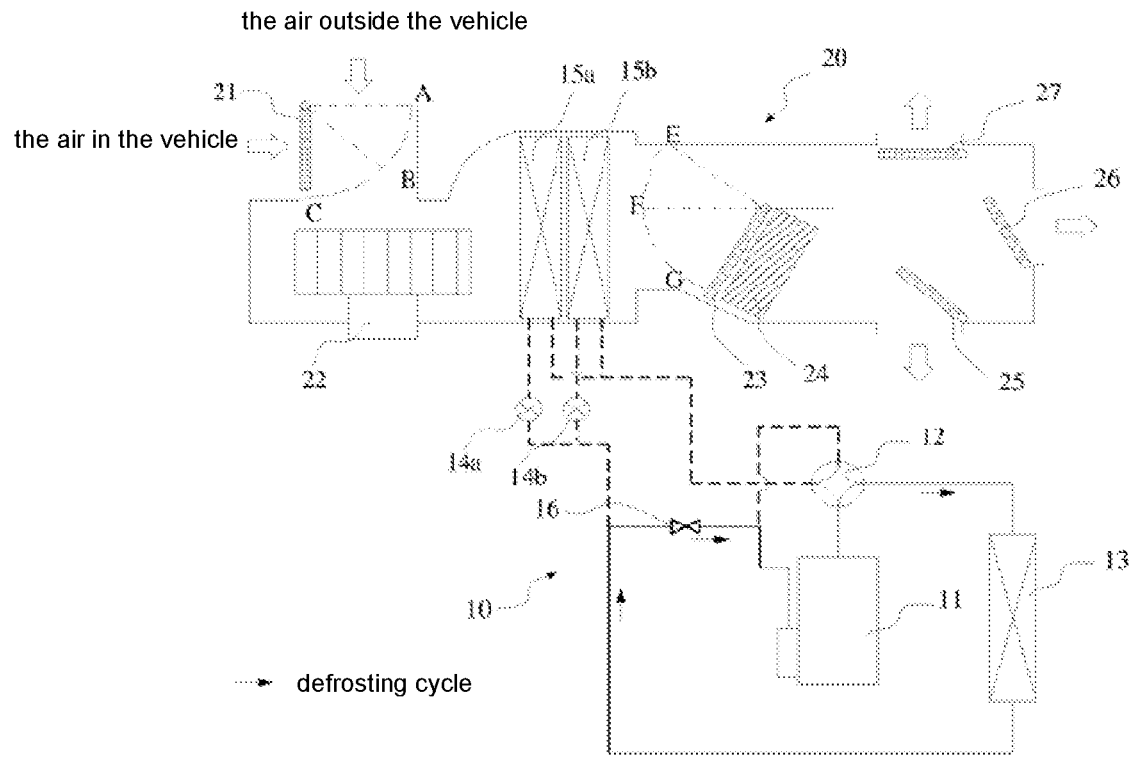
FIG. 4 is a schematic diagram of a cycle of a defrosting state of A heat pump air conditioner assembly for an electric vehicle disclosed in a first embodiment of the present disclosure.
Figure 5:
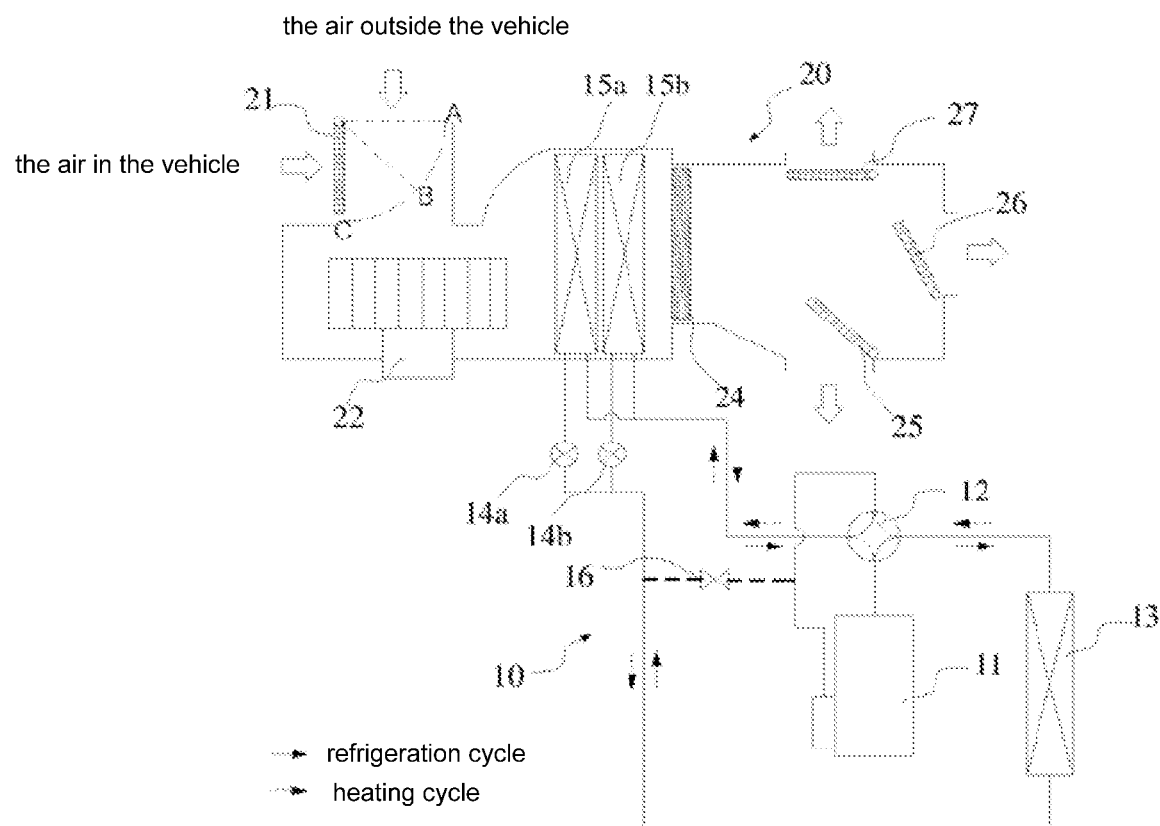
FIG. 5 is a schematic diagram of a refrigeration/heating mode system cycle of A heat pump air conditioner assembly for an electric vehicle disclosed in a second embodiment of the present disclosure.
Figure 6:
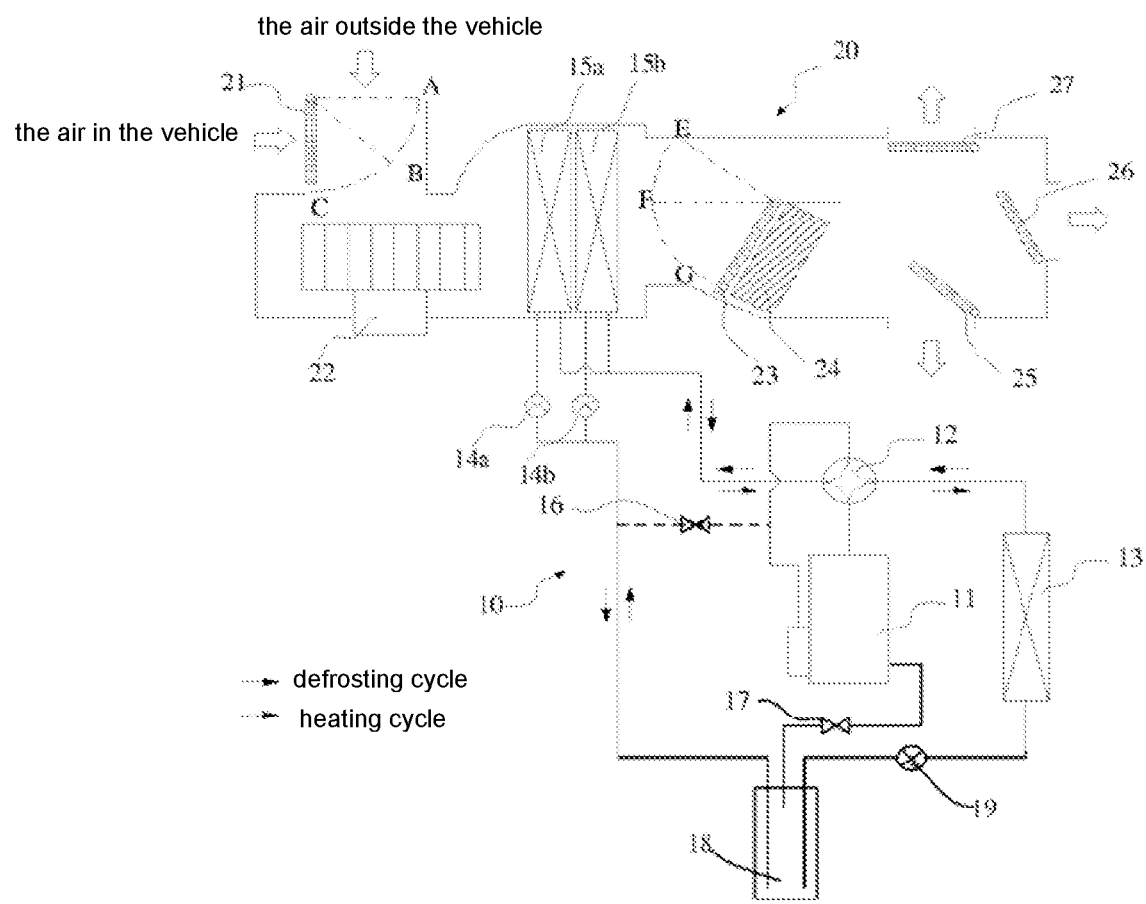
FIG. 6 is a schematic diagram of a refrigeration/heating mode system cycle of A heat pump air conditioner assembly for an electric vehicle disclosed in a third embodiment of the present disclosure.

For a defrosting mode of the outside-vehicle heat exchanger 13, as shown in FIG. 4, the refrigerant discharged from the exhaust port of the compressor 11 enters the outside-vehicle heat exchanger 13 for condensation heat release in order to defrost the outside-vehicle heat exchanger 13. The defrosting electromagnetic valve 16 is turned on. The refrigerant flowing out of the outside-vehicle heat exchanger 13 passes through the defrosting branch and the defrosting electromagnetic valve 16 and then returns to the interior of the compressor 11 to complete a cycle. Meanwhile, the auxiliary heater 24 arranged in the HVAC box body 20 is opened to continuously supply heat to the interior of the vehicle during the defrosting process of the heat pump air conditioning system 10. Air is drawn by an air blower into an air channel through the air inlet, heated by the auxiliary heat exchanger, and then sent to an air outlet of the HVAC box body 20. According to the switch settings of different air outlets in the vehicle, the treated comfortable air can reach different positions, and the adjusting member 21 at the air inlet can be manually or automatically selected to be at the first position, the second position or the third position to achieve an internal cycle, an internal or external cycle or an external cycle.

After the defrosting mode is completed, the heat pump air conditioning system 10 is switched to the high-power heating mode, and the auxiliary heater 24 is turned off.

Figure 7:
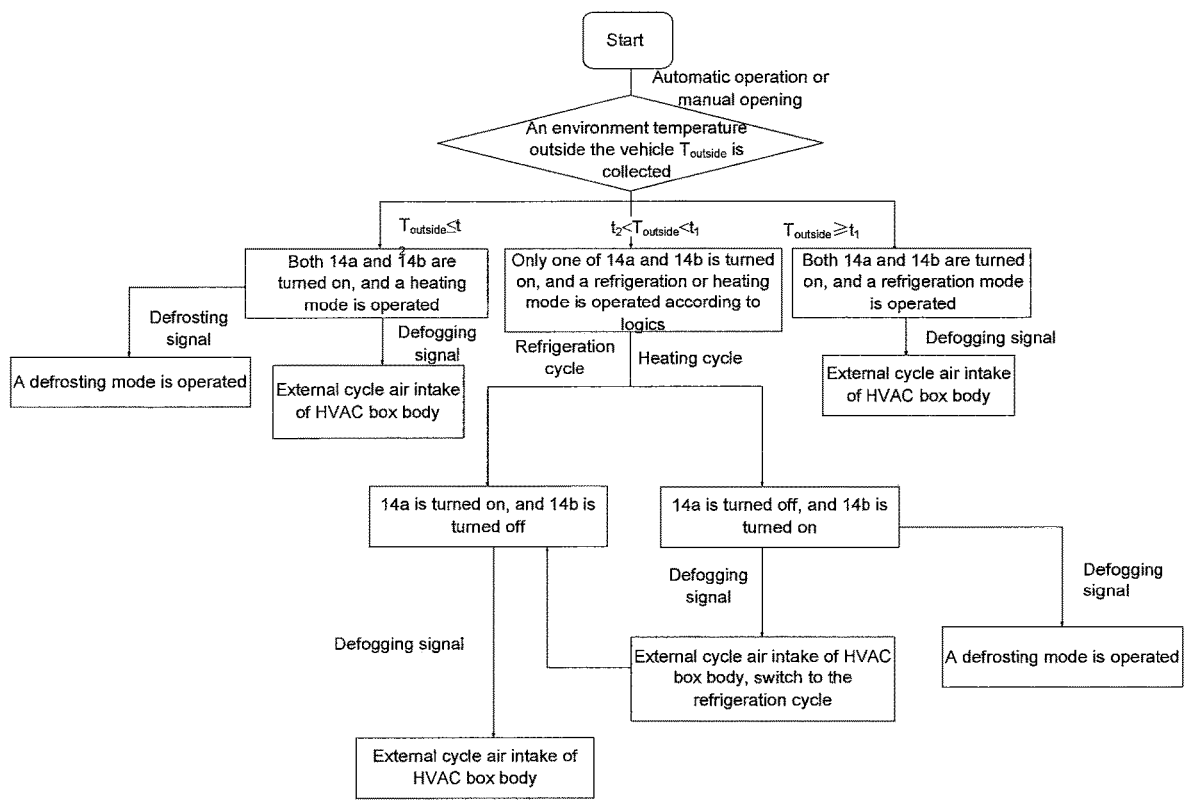
FIG. 7 is a control flow diagram of A heat pump air conditioner assembly for an electric vehicle disclosed in the present disclosure.

Referring to FIG. 7, a control method of the above heat pump air conditioner assembly for the electric vehicle is also disclosed in the present disclosure. In the control method, when a heat pump air conditioner is in a defrosting mode (defrosting of an outside-vehicle heat exchanger 13) mode, an HVAC box body 20 supplies air to the interior of the vehicle, an auxiliary heater 24 is turned on, and a cold and warm ventilation door 23 is located at a first position, that is, all of air is heated by the auxiliary heater 24 to ensure that a heat pump air conditioning system 10 can continuously supply heat to the interior of the vehicle in a defrosting mode. Meanwhile, an exhaust port of a compressor 11 connects with the outside-vehicle heat exchanger 13, and a defrosting electromagnetic valve 16 is turned on, so that a refrigerant passes through the outside-vehicle heat exchanger and then directly flows back to an air inlet of the compressor 11 by a defrosting branch and a third pipeline.

Further, the control method also includes: an environment temperature outside the vehicle $T_{outside}$ is collected and compared with a preset refrigeration temperature $t_1$. If $T_{outside}$ is greater than or equal to $t_1$, an action A is performed, the action A is: making both a first in-vehicle heat exchanger 15a and a second in-vehicle heat exchanger 15b serve as evaporators, and making the openness of a first throttling element 14a and a second throttling element 14b be a maximum value. That is, the heat pump air conditioning system enters a high-power refrigeration mode. In this mode, if there is a defogging need, it is also necessary to perform an action F, the action F is: making an air inlet of the HVAC box body 20 be switched to an external cycle.

An environment temperature outside the vehicle $T_{outside}$ is collected and compared with a preset heating temperature $t_2$, where $t_2$ is less than $t_1$. If $T_{outside}$ is less than or equal to $t_2$, an action B is performed, the action B is: making both the first in-vehicle heat exchanger 15a and the second in-vehicle heat exchanger 15b serve as condensers, and making the openness of the first throttling element 14a be a maximum value and making the openness of the second throttling element 14b be a maximum value. That is, the heat pump air conditioning system enters a high-power heating mode. In this mode, if there is a defogging need, it is also necessary to perform an action F, the action F is: an air inlet of the HVAC box body 20 is switched to an external cycle.

If $T_{outside}$ is greater than $t_2$ and less than $t_1$, a temperature in the vehicle $T_{in}$ is collected and compared with a preset mode switching temperature to. If $T_{in}$ is greater than or equal to $t_0$, an action C is performed, the action C is: making both the first in-vehicle heat exchanger 15a and the second in-vehicle heat exchanger 15b serve as evaporators, making the openness of the first throttling element 14a be a maximum value, and making the openness of the second throttling element 14b be a minimum value. That is, the heat pump air conditioning system enters a low-power refrigeration mode. In this mode, if there is a defogging need, it is also necessary to perform an action F, the action F is: making an air inlet of the HVAC box body 20 be switched to an external cycle. If $T_{in}$ is less than to and the heat pump air conditioning system 10 is not in a defrosting mode, an action D is performed, the action D is: making both the first in-vehicle heat exchanger 15a and the second in-vehicle heat exchanger 15b serve as condensers, making the openness of the first throttling element 14a be a minimum value, and making the openness of the second throttling element 14b be a maximum value. That is, the heat pump air conditioning system enters a low-power heating mode. In this mode, if there is a defogging need, it is also necessary to perform an action H, the action H is: making a four-way valve 12 be reversed, making both the first in-vehicle heat exchanger 15a and the second in-vehicle heat exchanger 15b serve as evaporators, making the openness of the first throttling element 14a be a maximum value, and making the openness of the second throttling element 14b be a minimum value, so that an air inlet of the HVAC box body 20 is switched to an external cycle. Of course, the auxiliary heater 24 may also be turned on to further heat and dry air after the dehumidification treatment by the first in-vehicle heat exchanger.

It is to be noted that in the present disclosure, $t_1$, $t_2$, and to are all set according to actual conditions. Generally, $t_1$ is greater than or equal to 29° C. and less than or equal to 32° C., $t_2$ is greater than or equal to 0° C. and less than or equal to 5° C., and to is greater than or equal to 22° C. and less than or equal to 25° C.

When the heat pump air conditioning system is in a defrosting mode, the control method controls the electric vehicle heat pump air conditioner to perform an action E specifically, the action E is: making an exhaust port of the compressor 11 connect with the outside-vehicle heat exchanger 13, and making the openness of the first throttling element 14a be a minimum value and making the openness of the second throttling element 14b be a minimum value, turning on a defrosting electromagnetic valve 16, the HVAC box body 20 supplying air to the interior of the vehicle, and turning on the auxiliary heater 24. That is, the defrosting mode of the outside-vehicle heat exchanger 13 is entered.

A second embodiment is also provided in the present disclosure. Compared with the heat pump air conditioner assembly for the electric vehicle in the first embodiment, the difference of the second embodiment is the change of the structure of the HVAC box body 20, and the cold and warm ventilation door 23 and the corresponding air channel are eliminated to reduce the air intake resistance. The heat pump air conditioning system 10 and the operation mode thereof are identical to those in the first embodiment.

A third embodiment is also provided in the present disclosure. Compared with the heat pump air conditioner assembly for the electric vehicle in the first embodiment, the difference of the third embodiment is the change of the heat pump air conditioning system 10. The heat pump air conditioning system includes a flash evaporator 18 disposed on the fifth pipeline. The flash evaporator 18 is connected with an air supply port of the compressor 11 to realize air supply and enthalpy increase during heating. Of course, the compressor 11 may be a single-stage compressor 11 or a two-stage or multi-stage compressor 11.

In addition, an electric vehicle is disclosed in the present disclosure, which is with the heat pump air conditioner assembly for the electric vehicle disclosed in any of the above embodiments.

Since the above heat pump air conditioner assembly for the electric vehicle is adopted, the electric vehicle has the technical advantages corresponding to the above heat pump air conditioner assembly, and will not be described in detail herein.

The electric vehicle, the heat pump air conditioner assembly for the electric vehicle and the control method thereof provided by the present disclosure are described in detail above. The principles and implementation manners of the present disclosure have been described herein with specific examples, and the description of the above embodiments is only to assist in understanding the method of the present disclosure and its core idea. It is to be noted that a number of modifications and refinements may be made on the present disclosure by those of ordinary skill in the art without departing from the principles of the present disclosure, and such modifications and refinements also fall within the scope of protection of the present disclosure.

What is claimed is:

1. A control method for controlling an heat pump air conditioner assembly for an electric vehicle, the heat pump air conditioner assembly for the electric vehicle comprising a heat pump air conditioning system, a Heating, Ventilation and Air Conditioning (HVAC) box body and an auxiliary heater, wherein in the heat pump air conditioning system, a four-way valve comprises four ports, a first port of the four ports connects with an exhaust port of a compressor by a first pipeline, a second port of the four ports connects with an outside-vehicle heat exchanger by a second pipeline, a third port of the four ports connects with a suction port of the compressor by a third pipeline, and a fourth port of the four ports connects with an in-vehicle heat exchanger by a fourth pipeline, the outside-vehicle heat exchanger and the in-vehicle heat exchanger are connected in series by a fifth pipeline to form a refrigerant loop; the heat pun air conditioning system further comprises a defrosting branch and a defrosting electromagnetic valve; one end of the defrosting branch connects with the fifth pipeline, and an other end of the defrosting branch connects with the third pipeline; the defrosting electromagnetic valve is arranged on the defrosting branch, and the defrosting electromagnetic valve is configured to control an on-off of the defrosting branch; the in-vehicle heat exchanger is located in the HVAC box body; the auxiliary heater is also arranged in the HVAC box body; the auxiliary heater is located at a leeward side of the in-vehicle heat exchanger and when the heat pump air conditioning system is in a defrosting mode the defrosting electromagnetic valve is turned on, the HVAC box body supplies air to the vehicle, and the auxiliary heater is turned on, wherein the in-vehicle heat-exchanger comprises a first in-vehicle heat exchanger and a second in-vehicle heat exchanger connected in parallel, wherein the first in-vehicle heat exchanger connects with the fifth pipeline by a first inflow branch and connects with the fourth pipeline by a first outflow branch; the second in-vehicle heat exchanger connects with the fifth pipeline by a second inflow branch and connects with the fourth pipeline by a second outflow branch the first inflow branch is provided with a first throttling element and the second inflow branch is provided with a second throttling element, wherein collect an environment temperature outside the vehicle $T_{outside}$ and compare with a preset refrigeration temperature t1; and if $T_{outside}$ is greater than or equal to $t_1$, perform an action A, the action A is: making both the first in-vehicle heat exchanger and the second in-vehicle heat exchanger serve as evaporators, and making an openness of the first throttling; element be a maximum value and making an openness of the second throttling element be a maximum value the maximum value is a maximum opening that the second throttling element can be achieved, wherein collect the environment temperature outside the vehicle $T_{outside}$ and compare with a preset heating temperature $t_2$, where $t_2$ is less than $t_1$, and if $T_{outside}$ is less than or equal to $t_2$, perform an action B, the action B is: making both the first in-vehicle heat exchanger and the second in-vehicle heat exchanger serve as condensers, and making an openness of the first throttling element be the maximum value and an openness of the second throttling element be the maximum value,
- wherein $t_1$ is greater than or equal to 29° C. and less than or equal to 32° C., $t_2$ is greater than or equal to 0° C. and less than or equal to 5° C., and $t_0$ is greater than or equal to 22° C. and less than or equal to 25° C.

2. The control method according to claim 1, wherein the heat pump air conditioning system comprises a flash evaporator disposed on the fifth pipeline, and the compressor comprises an air supply port, wherein the flash evaporator is connected with the air supply port of the compressor.

3. The control method according to claim 1, wherein an air inlet of the HVAC box body is provided with an internal and external cycle ventilation door; when the internal and external cycle ventilation door is located at a first position, the air inlet of the HVAC box body is separated from an exterior of the vehicle and connects with a cab; when the internal and external cycle ventilation door is located at a second position, the air inlet of the HVAC box body connects with both the exterior of the vehicle and the cab; and when the internal and external cycle ventilation door is located at a third position, the air inlet of the HVAC box body connects with the exterior of the vehicle and is separated from the cab.

4. The control method according to claim 1, wherein the auxiliary heater is a Positive Temperature Coefficient (PTC) heater.

5. The control method according to claim 1, wherein when the heat pump air conditioning system is in the defrosting mode, make the exhaust port of the compressor connect with the outside-vehicle heat exchanger, and make the defrosting electromagnetic valve turn on, so that the refrigerant passes through the outside-vehicle heat exchanger and then directly flows back to the suction port of the compressor by the defrosting branch and the third pipeline, and make the Heating, Ventilation and Air Conditioning (HVAC) box body supply air to an interior of the vehicle, and turn on the auxiliary heater.

6. The control method according to claim 1, wherein when fall the heat pump air conditioning system is in the defrosting mode, make the exhaust port of the compressor connect with the outside-vehicle heat exchanger, make the defrosting electromagnetic valve turn on, make the Heating, make Ventilation and Air Conditioning (HVAC) box body supply air to an interior of the vehicle, turn on the auxiliary heater, and make the warm ventilation door locate at the first position.

7. The control method according to claim 1, wherein if $T_{outside}$ is greater than $t_2$ and less than $t_1$, collect a temperature in the vehicle Tin and compare with a preset mode switching temperature $t_0$; if $T_{in}$ is greater than or equal to $t_0$, perform an action C, the action C is: making both the first in-vehicle heat exchanger and the second in-vehicle heat exchanger serve as evaporators, and making the openness of the first throttling element be a maximum value, and making the openness of the second throttling element be a minimum value; and if $T_{in}$ is less than to and a heat pump air conditioning system is not in a defrosting mode, perform an action D, the action D is: making both the first in-vehicle heat exchanger and the second in-vehicle heat exchanger serve as condensers, making the openness of the first throttling element be a minimum value, and making the openness of the second throttling element be the maximum value, the minimum value is a maximum opening that can be achieved.

8. The control method according to claim 7, wherein when $T_{outside}$ is greater than $t_2$ and less than $t_1$ and $T_{in}$ is greater than or equal to $t_0$, if the heat pump air conditioning system is in the defrosting mode, perform an action F in addition to the action C, the action F is: making the air inlet of the HVAC box body switch to an external cycle; and when $T_{outside}$ is greater than $t_2$ and less than $t_1$ and $T_{in}$ is less than $t_0$, if the heat pump air conditioning system is in the defrosting mode, perform an action H, the action H is: making the four-way valve reverse, making both the first in-vehicle heat exchanger and the second in-vehicle heat exchanger serve as evaporators, making the openness of the first throttling element be a maximum value, and making the openness of the second throttling element be a minimum value, so that making the air inlet of the HVAC box body switch to the external cycle, the maximum value is a maximum opening that the first throttling element can be achieved, the minimum value is a maximum opening that the second throttling element can be achieved.

9. The control method according to claim 8, wherein when $T_{outside}$ is greater than $t_2$ and less than $t_1$ and $T_{in}$ is less than $t_0$, if the heat pump air conditioning system is in the defrosting mode, perform an action K, the action K is: turning on the auxiliary heater.

10. The control method according to claim 1, wherein when the heat pump air conditioning system is in the defrosting mode, perform an action E, the action E is: making the exhaust port of a compressor connect with the outside-vehicle heat exchanger, and making the openness of the first throttling element be a minimum value and making the second throttling element be a minimum value, turning on the defrosting electromagnetic valve, the Heating, Ventilation and Air Conditioning (HVAC) box body supplying air to an interior of the vehicle, and turning on the auxiliary heater, the minimum value is a maximum opening that can be achieved.

11. The control method according to claim 1, wherein when $T_{outside}$ is greater than or equal to $t_1$ and the heat pump air conditioning system is in the defrosting mode, perform an action F in addition to the action A, the action F is: making the air inlet of the HVAC box body switch to an external cycle.

12. The control method according to claim 1, wherein when $T_{outside}$ is less than or equal to $t_2$ and the heat pump air conditioning system is in the defrosting mode, perform an action F in addition to the action B, the action F is: making an air inlet of a HVAC box body switch to an external cycle.

13. The control method according to claim 1, wherein the heat pump air conditioner assembly comprises a warm ventilation door arranged in the HVAC box body, the a warm ventilation door is located at the leeward side of the in-vehicle heat exchanger; when the warm ventilation door is located at a first position, all of intake air passes through the auxiliary heater; when the warm ventilation door is located at a second position, a portion of intake air passes through the auxiliary heater; and when the warm ventilation door is located at a third position, all of intake air does not pass through the auxiliary heater.

* * * * *